March 23, 1954  W. H. SILVER ET AL  2,672,803
DISK TERRACING MACHINE
Filed Dec. 1, 1950  3 Sheets-Sheet 1

INVENTORS.
WALTER H. SILVER
ROBERT E. COX
BY
ATTORNEYS

March 23, 1954  W. H. SILVER ET AL  2,672,803
DISK TERRACING MACHINE.

Filed Dec. 1, 1950  3 Sheets-Sheet 2

INVENTORS.
WALTER H. SILVER
ROBERT E. COX
BY

ATTORNEYS

March 23, 1954   W. H. SILVER ET AL   2,672,803
DISK TERRACING MACHINE
Filed Dec. 1, 1950   3 Sheets-Sheet 3

INVENTORS.
WALTER H. SILVER.
ROBERT E. COX
BY
ATTORNEYS

Patented Mar. 23, 1954

2,672,803

UNITED STATES PATENT OFFICE 2,672,803

DISK TERRACING MACHINE

Walter H. Silver and Robert E. Cox, Moline, Ill., assignors to Deere & Company, Moline, Ill., a corporation of Illinois Application December 1, 1950, Serial No. 198,681

6 Claims. (Cl. 97—47.07)

1

The present invention relates generally to agricultural implements and more particularly to ground-working implements of the type that are adapted to be mounted directly on a tractor and propelled thereby.

The object and general nature of the present invention is the provision of a new and improved tractor-mounted disk plow in which the plow beam is connected with the tractor for generally rocking movement about a generally fore-and-aft extending axis and supported at its rear end on the rear portion of the tractor and at its forward end on a ground-engaging wheel which is connected to be steered by the steering wheel means of the tractor. Further, it is a feature of this invention to provide new and improved means for swinging said beam about its generally fore-and-aft extending axis whereby both the furrow opener disk and the ground wheel will be maintained in a generally vertical position relative to the ground, even though the tractor may be operated in a tilted position. Additionally, it is an important feature of the present invention to provide a stabilizing link connecting the front portion of the plow beam member with the tractor, which stabilizing link is disposed generally parallel with respect to the steering link that connects the ground wheel of the implement with the front steerable means of the tractor, whereby up-and-down movement of the beam relative to the tractor will not appreciably affect the steering connection between the ground wheel of the implement and the tractor front wheel means.

These and other objects and advantages of the present invention will be apparent to those skilled in the art after a consideration of the following detailed description of a specific embodiment of the present invention, taken in conjunction with the accompanying drawings showing said embodiment by way of illustration.

Figure 1:
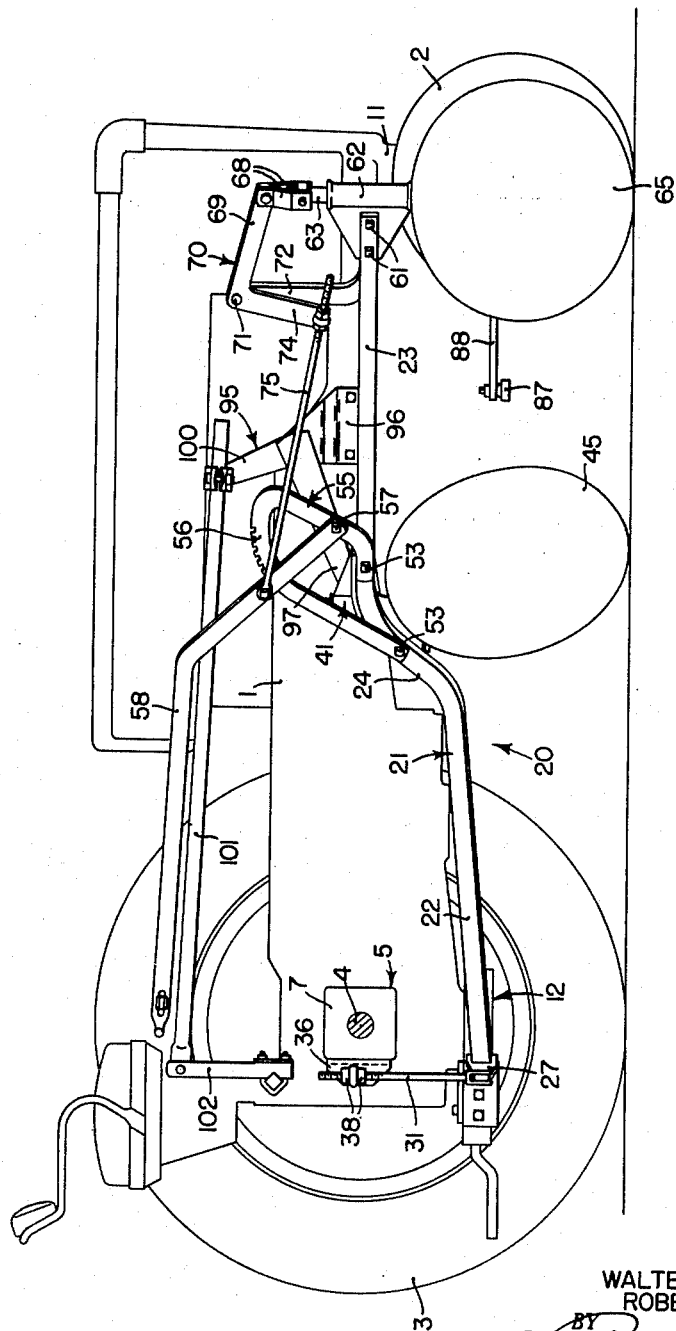
Figure 1 is a side view of a tractor-mounted disk plow in which the principles of the present invention have been incorporated.

The tractor on which the plow of the present invention has been mounted is conventional, so far as the present invention is concerned, including a frame 1 supported on a pair of front steerable wheels 2, a pair of rear drive wheels 3 fixed to the outer ends of a pair of axle shafts 4 journaled for rotation in a rear axle structure 5, the latter including laterally outwardly extending axle housings 6 and 7. The front steerable wheels 2 are mounted for rotation on axle means 9 that is fixed to the lower end of a generally vertical steering shaft, the front end of the tractor being supported on the axle means 9 through a front pedestal 11. Mounted centrally on the rear portion of the tractor rear axle 5 is a drawbar support 12 which includes a pair of angle members 13 and crossbars 14 secured to the rear ends of the angle members 13 and between which a swinging drawbar 15 is disposed.

The disk plow in which the principles of the present invention have been incorporated is indicated in its entirety by the reference numeral 20 and comprises a beam member 21, preferably formed of square bar stock, having a rear beam section 22, a forward beam section 23, and a curved section 24 connecting the front and rear sections 22 and 23 in vertically offset relation. The rear end of the plow beam 21 is received loosely in the apertured portion of a draft bracket 25 which is adapted to be connected, as at 26, by bolt means or the like, to the right-hand angle member 13 of the tractor drawbar 12. A tilting arm 27 is rigidly fixed, as by welding, to the rear end of the plow beam, preferably immediately forwardly of the draft bracket 25, and extends laterally outwardly therefrom substantially horizontally and underneath the right-hand rear axle section 7. The draft bracket 25 includes an angled support member 28, apertured to receive the bolts 26, having a forward transverse section 29 having an enlarged opening 29a in which the rear end of the square beam section 22 is rockably received. A locking pin 30 holds the beam 22 in position, with the arm 27 against the forward side of the transverse bracket section 29 of the bracket 25. An adjusting bolt 31 having a bifurcated portion 32 pivotally connected by a pin 33 to the outer end of the arm 27, extends upwardly from the latter and has its threaded end 34 extended through the eye of a swivel pin 35 carried by a bracket 36 that is adapted to be fixed, as by the rear axle stud bolts 37 or the like, to the outer end of the right-hand axle section 7. A pair of lock nuts 38 provide means whereby, by loosening one and tightening the other, the arm 27 may be raised or lowered at its outer end to swing the beam 21 about its longitudinal axis.

A casting member 41 is shaped to fit against the curved beam section 24 and is constructed to provide a vertical sleeve 42 in which a disk standard spindle 43 is disposed. The lower end of the spindle 43 carries suitable bearing means by which a disk 45 is rotatably mounted on the lower end of the standard 43. An arm 47 is fixed to the standard or spindle 43, just below the casting member 41, and is slotted, as at 48, to receive a bolt 49 which may be placed in any one of several openings 51 formed in a lower horizontal web portion 52 of the casting member 41. By virtue of this construction, the disk 45 may be adjusted about a generally vertical axis to present the disk at the proper angle depending upon soil and/or other conditions. The sleeve casting member 41 is fixed to the central portion of the beam 21 by a pair of bolts 53 or other suitable means, which is also utilized as a means for securing to the plow beam a strap member 55 formed to provide a sector 56 and apertured to receive a pin or bolt 57 by which a hand lever 58 is pivotally connected with the sector bracket 55. The purpose of the hand lever will be described below.

Secured to the front end of the beam 21, as by a pair of bolts 61, is a vertical sleeve member 62 which receives the upper spindle section 63 of a gauge wheel axle member 64, the lower end of which is turned laterally outwardly to receive a ground-engaging gauge wheel 65 rotatably mounted on the lower end of the axle member 64. The upper end of the ground wheel spindle 63 carries a trunnion 67 to which the lower ends of a pair of short links 68 are connected. The upper ends of the links 68 are pivotally connected to one arm 69 of a bell crank 70 that is swingably mounted, as at 71, on a bracket 72 fixed in any suitable way to the forward portion of the beam 20, preferably by the same bolts 61 which hold the forward vertical sleeve member 62 on the beam. The other arm 74 of the bell crank 70 is connected by means of an adjustable link 75 to the hand lever 58, whereby changing the position of the latter results in raising or lowering the ground wheel spindle 63 relative to the front end of the beam 21, thus providing for varying the depth of operation of the disk 45.

Figure 2:
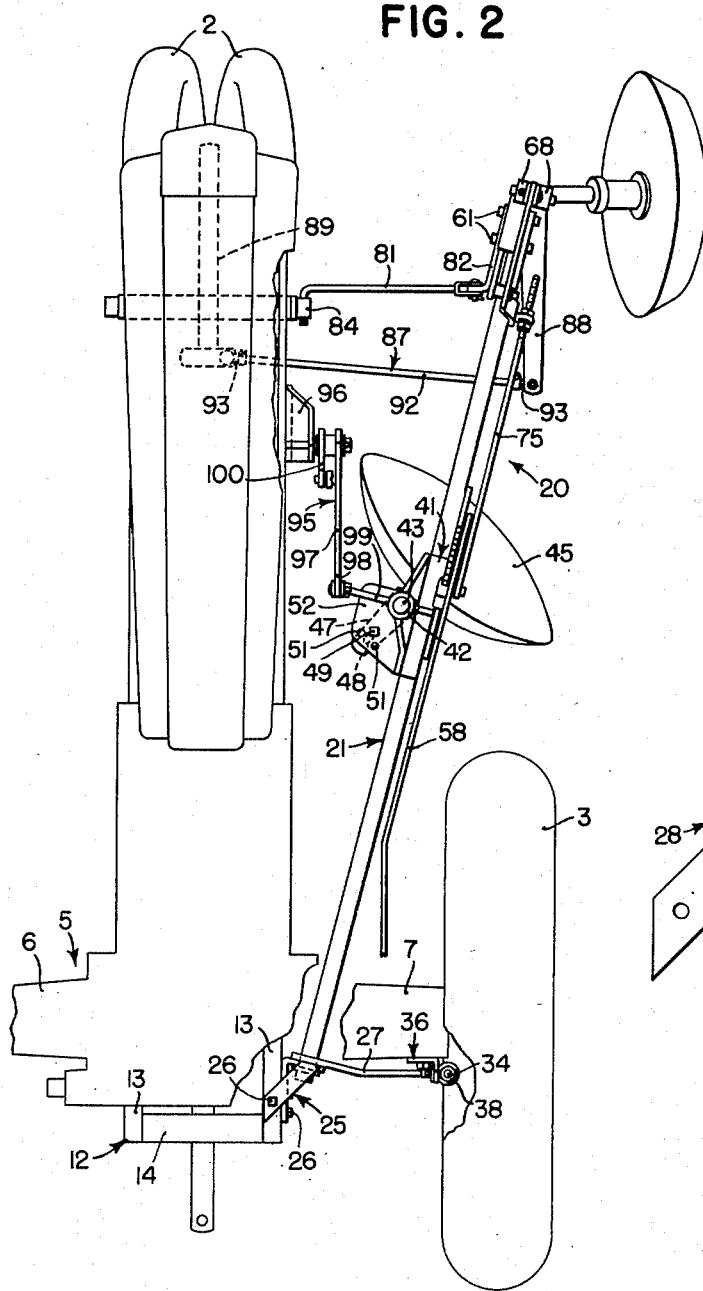
Figure 2 is a plan view of the plow shown in Figure 1.
Figure 5:
Figure 4 is a fragmentary rear view and Figure 5 is an enlarged detail view showing the draft connection between the rear end of the beam and the tractor.
Figure 3:
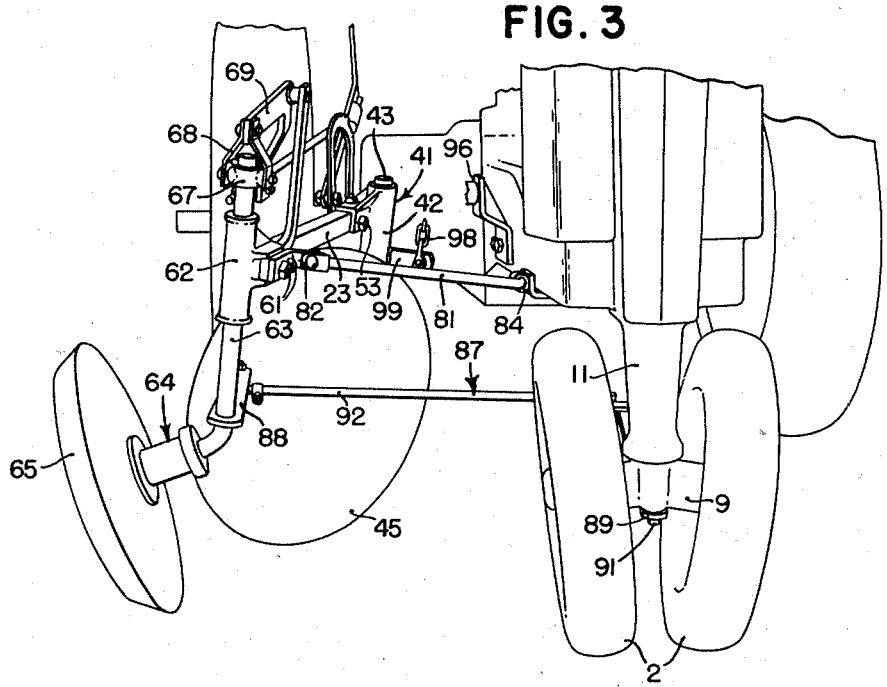
Figure 3 is a front view of the implement shown in Figures 1 and 2.
Figure 4:
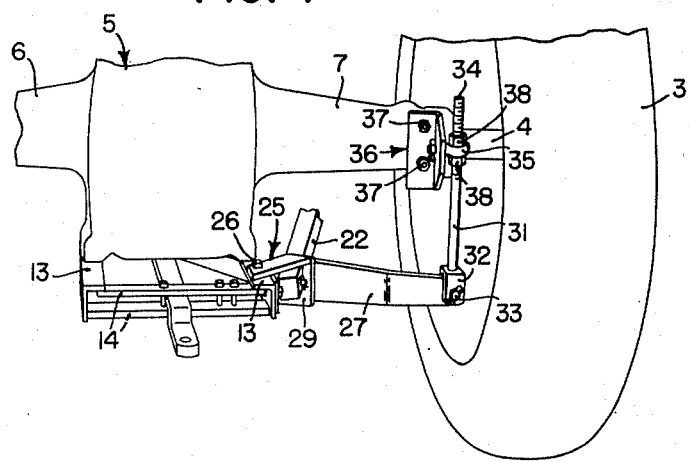

The front end of the beam 21 is connected against transverse movement relative to the tractor by means of a stabilizing link 81 which, at its outer end, is loosely pivoted to a bracket 82 that is fixed to the front end of the beam 21, preferably by the bolts 61 mentioned above. The inner end of the stabilizing link 81 is pivotally connected to a bracket 84 that is bolted to the forward portion of the tractor. The stabilizing link 81, it will be noted, is disposed sufficiently rearwardly and upwardly with respect to the front wheels 2 of the tractor that there is no interference between the stabilizing link and the front wheels in any position of the plow relative to the tractor. Disposed underneath and generally parallel to the stabilizing link 81 is a steering link 87 which is pivotally connected, as by a ball and socket joint, to the rear end of a steering arm 88 that at its forward end is rigidly secured, as by welding to the lower end of the ground wheel axle 64. The laterally inner end of the steering link 87 is connected to the rear end of a steering arm 89, as by a ball and socket joint, the steering arm 89 being apertured or otherwise constructed so as to receive bolt means 91 which fasten the forward end of the steering arm 89 to the lower portion of the front wheel axle member 9, whereby turning of the front steering means of the tractor in one direction or the other results in a lateral swinging of the inner steering arm 89, which motion is transmitted through the link 87 to the ground wheel steering arm 88. The effective length of the steering link 87 may be adjusted by virtue of a pair of adjustably connected, telescopically associated members 92 and 93 (Figure 2), which may be adjusted one relative to the other to shorten or lengthen the steering link 87, as desired.

A bell crank 95 is mounted on the tractor, as by a mounting bracket 96, and one arm 97 of the bell crank is connected through a chain 98 with the plow beam 91, preferably through a lug 99 on the sleeve member 41. The other arm 100 is pivotally connected in any suitable way to the forward end of a push bar 101 that extends alongside the tractor and at its rear end is pivotally connected to one of the power lift arms 102 of the tractor. Whenever the power lift of the tractor is actuated to raise the implement associated therewith, a forward push is exerted through the bar 101, which swings the bell crank 95 in a clockwise direction, as viewed in Figure 1, by virtue of which the chain 98 is raised, thus resulting in an upward swinging of the plow beam 21 about its rear connection with the tractor.

In operation, the bell crank 95 is swung in a counterclockwise direction to lower the plow into contact with the ground, the depth of operation being determined by the position of the ground wheel 65 relative to the plow disk 45, which may be adjusted by changing the position of the hand lever 58 as mentioned above. During plowing, the chain 98 is slack so that the plow beam and associated parts may swing upwardly or downwardly, relative to the tractor, as required by the particular terrain over which the outfit is traveling. Usually, the tractor is operated in a tilted position when plowing, the angle of tilt varying with the depth of plowing. For best operation, however, the ground wheel 65 and the disk 45 should be disposed in a normal upright position, which should not appreciably vary, regardless of the angle of tilt of the tractor or the slope of the ground, in case the outfit is operated on a hillside. Accordingly, the plow beam 21 may be adjusted, by virtue of the lock nuts 38 and the adjusting bolt 31, so as to swing the plow beam 21 relative to the tractor about the axis defined by the rear draft bracket 25 and the pivotal connection between the outer end of the stabilizing link 81 and the front end of the plow beam. Swinging the latter about its fore-and-aft extending axis, as just defined, results in adjusting the position of both sleeve members 41 and 62 so that these members are always maintained in substantially a vertical position relative to the horizontal. As a result of this construction, easy steering of the ground wheel 65 is accomplished and therefore the control of the ground wheel 65 by the front steerable wheel means of the tractor does not materially affect the operation of the tractor steering mechanism nor does it cause hard steering of the tractor. It will be noted that adjustment of the disk 45 in the casting member 41 is about a generally vertical axis substantially parallel to the axis of swinging of the ground wheel spindle 63 in the sleeve section 62 at the front end of the plow beam.

While we have shown and described above the preferred structure in which the principles of the present invention have been incorporated, it is to be understood that our invention is not to be limited to the particular means, shown and described above, but that, in fact, widely different means may be employed in the practice of the broader aspects of our invention.

What we claim therefore, and desire to secure by Letters Patent is:

1. A disk plow adapted to be mounted on a tractor having a front steering means, said plow comprising a rigid beam member adapted to extend generally forwardly alongside the tractor, a draft bracket attachable rigidly to the rear portion of the tractor and having an opening rotatably and rockably receiving the rear end of said beam, a disk furrow opener carried by the generally central portion of said beam in depending relation, a sleeve fixed to the forward end of said beam and extending generally vertically, a wheel spindle rotatable at its upper portion in said sleeve and at its lower portion carrying a ground wheel, a first rearwardly extending arm fixed at its forward end to said spindle, a second rearwardly extending arm adapted to be fixed at its forward end to the front steering means of the tractor, a steering link connecting the rear ends of said arms, a stabilizing link disposed generally transversely and connected at its laterally outer end with said beam and adapted to be pivotally connected at its inner end with the forward portion of the tractor, and means connected with said beam for rocking the latter relative to the tractor about the axis defined by the aperture in said draft bracket and the pivotal connection between the outer end of said stabilizing link and said beam, thereby providing for retaining said disk and said wheel spindle, together with said wheel carried by the latter, in a generally vertical position when the tractor is operated in a tilted position.

2. A tractor-mounted disk plow adapted to be mounted on a tractor having a rear drawbar support and a front steerable wheel means, said disk plow comprising a rigid beam member adapted to extend generally forwardly alongside the tractor, a draft bracket attachable rigidly to said rear drawbar support and having an opening rotatably and rockably receiving the rear end of said beam, a disk furrow opener having a generally upwardly extending standard, a bracket including generally vertically extending sleeve means receiving the upper portion of said disk standard and attachable to the generally central portion of said beam, means for fixing said standard to said bracket in different positions about the vertical axis defined by said sleeve, a second sleeve fixed to the forward end of said beam in generally parallel relation with said first mentioned sleeve, a wheel spindle rotatable in said second sleeve and carrying a ground wheel at its lower end, a first rearwardly extending arm fixed at its forward end to said spindle, a second rearwardly extending arm adapted to be fixed at its forward end to said front steerable wheel means of the tractor, a stabilizing link pivotally connected with said beam and adapted to be pivotally connected with the tractor and extending generally parallel with said steering link, the latter including adjustable means for varying the effective length of said steering link, and means acting between the tractor and the rear portion of said beam for rocking the latter relative to the tractor about the axis defined by said draft bracket and the outer end of said stabilizing link, so as to bring both of said sleeves substantially to and retain them in a generally vertical position, as when the tractor is operated in a tilted position, said steering link being adapted to be adjusted when said beam is rocked about said axis.

3. A tractor-mounted disk plow adapted to be mounted on a tractor having a front steerable wheel means, said disk plow comprising a rigid beam member adapted to extend generally forwardly alongside the tractor, means for connecting the rear portion of said beam member in draft-transmitting relation with the rear portion of the tractor, said means including parts accommodating rocking of said beam about a generally fore-and-aft extending axis and up-and-down movement of the front portion of said beam member, a disk furrow opener carried by the generally central portion of said beam in depending relation, an arm fixed to the rear portion of said beam, means adapted to act between the tractor and the outer end of said arm for shifting said beam about said axis, a sleeve fixed to the forward end of said beam and extending generally vertically, a wheel spindle rotatable in said sleeve and carrying a ground wheel at its lower end, a first rearwardly extending arm fixed at its forward end to said spindle, a second rearwardly extending arm adapted to be fixed at its forward end to said tractor front wheel means, a steering link connecting the rear ends of said arms so as to accommodate up-and-down movement of said beam member relative to the tractor while effecting a steering movement of said ground wheel by virtue of movement of the tractor front steerable wheel means, and a stabilizing link extending generally parallel relative to said steering link and connected at its outer end with the front portion of said beam member and adapted to be connected at its inner end with said tractor for generally vertical swinging relative to the latter.

4. A tractor-mounted disk plow adapted to be mounted on a tractor having a rear drawbar support and a front steerable wheel means, said disk plow comprising a rigid beam member adapted to extend generally forwardly alongside the tractor, a draft bracket attachable rigidly to said rear drawbar support and having an opening rotatably and rockably receiving the rear end of said beam, a disk furrow opener having a generally upwardly extending standard, a bracket attachable to said beam, means for fixing said standard to said bracket, a sleeve fixed to the forward end of said beam, a wheel spindle rotatable in said sleeve and carrying a ground wheel at its lower end, a first rearwardly extending arm fixed at its forward end to said spindle, a second rearwardly extending arm adapted to be fixed at its forward end to said front steerable wheel means of the tractor, a stabilizing link pivotally connected with said beam and adapted to be pivotally connected with the tractor and extending generally parallel with said steering link, the latter including adjustable means for varying the effective length of said steering link, and means acting between the tractor and the rear portion of said beam for rocking the latter relative to the tractor about the axis defined by said draft bracket and the outer end of said stabilizing link, so as to bring said sleeve substantially to and retain it in a generally vertical position, as when the tractor is operated in a tilted position.

5. A tractor-mounted disk plow adapted to be mounted on a tractor having a front steerable wheel means, said disk plow comprising a rigid beam member adapted to extend generally forwardly alongside the tractor, means for connecting the rear portion of said beam member in draft-transmitting relation with the rear portion of the tractor, said means including parts accommodating rocking of said beam about a generally fore-and-aft extending axis and up-and-down movement of the front portion of said beam member, a disk furrow opener carried by said beam, an arm fixed to the rear portion of said beam, means adapted to act between the tractor and the outer end of said arm for shifting said beam about said axis, a sleeve fixed to the forward end of said beam and extending generally vertically, a wheel spindle rotatable in said sleeve and carrying a ground wheel at its lower end, a first rearwardly extending arm fixed at its forward end to said spindle, a second rearwardly extending arm adapted to be fixed at its forward end to said tractor front wheel means, a steering link connecting the rear ends of said arms so as to accommodate up-and-down movement of said beam member relative to the tractor while effecting a steering movement of said ground wheel by virtue of movement of the tractor front steerable wheel means, and a stabilizing link extending generally parallel relative to said steering link and connected at its outer end with the front portion of said beam member and adapted to be connected at its inner end with said tractor for generally vertical swinging relative to the latter.

6. A disk plow adapted to be mounted on a tractor having a front steering means, said plow comprising a rigid beam member adapted to extend generally forwardly alongside the tractor, a draft bracket attachable rigidly to the rear portion of the tractor and rotatably and rockably receiving the rear end of said beam, a disk furrow opener carried by said beam in depending relation, a sleeve fixed to the forward end of said beam and extending generally vertically, a wheel spindle rotatable at its upper portion in said sleeve and at its lower portion carrying a ground wheel, a first arm fixed adjacent one end to said spindle, a second arm adapted to be fixed adjacent one end to the front steering means of the tractor, a steering link connecting the other ends of said arms, a stabilizing link disposed generally transversely and connected at its laterally outer end with said beam and adapted to be pivotally connected at its inner end with the forward portion of the tractor, and means including relatively movable parts adapted to be fixed in different positions for holding said beam in different positions relative to the tractor about the axis of rockable connection of the beam with said bracket, thereby providing for retaining said disk and said wheel spindle, together with said wheel carried by the latter, in a generally vertical position when the tractor is operated in a tilted position.

WALTER H. SILVER.
ROBERT E. COX.

References Cited in the file of this patent
UNITED STATES PATENTS

| Number | Name | Date |
|---|---|---|
| 1,361,638 | Stephenson | Dec. 7, 1920 |
| 2,059,140 | Oldendorf | Oct. 27, 1936 |
| 2,295,898 | Hollis | Sept. 15, 1942 |
| 2,339,225 | Strandlund | Jan. 11, 1944 |
| 2,424,372 | Silver | July 22, 1947 |
| 2,425,806 | Ing | Aug. 19, 1947 |